(12) United States Patent
Miyazaki et al.

(10) Patent No.: US 8,081,277 B2
(45) Date of Patent: Dec. 20, 2011

(54) LIQUID CRYSTAL DISPLAY PANEL, LIQUID CRYSTAL DISPLAY DEVICE, AND METHOD OF MANUFACTURING LIQUID CRYSTAL DISPLAY PANEL

(75) Inventors: Yoshio Miyazaki, Kirishima (JP); Katsumi Tsuchida, Kyoto (JP)

(73) Assignee: Kyocera Corporation, Kyoto (JP)

( * ) Notice: Subject to any disclaimer, the term of this patent is extended or adjusted under 35 U.S.C. 154(b) by 115 days.

(21) Appl. No.: 12/272,561

(22) Filed: Nov. 17, 2008

(65) Prior Publication Data

US 2009/0079908 A1 Mar. 26, 2009

Related U.S. Application Data

(63) Continuation of application No. PCT/JP2007/060508, filed on May 23, 2007.

(30) Foreign Application Priority Data

May 30, 2006 (JP) .................. 2006-149690

(51) Int. Cl.
 G02F 1/1335 (2006.01)
 G02F 1/1333 (2006.01)
 G02F 1/13 (2006.01)
(52) U.S. Cl. ........ 349/114; 349/108; 349/110; 349/113; 349/187
(58) Field of Classification Search .................. 349/84, 349/106, 110, 114, 108, 113, 153
See application file for complete search history.

(56) References Cited

U.S. PATENT DOCUMENTS

2003/0076464 A1 4/2003 Ozawa et al. .................. 349/113
2004/0233353 A1* 11/2004 Nakano et al. .............. 349/106
2005/0185121 A1 8/2005 Takizawa
2005/0275775 A1 12/2005 Hinata et al.

FOREIGN PATENT DOCUMENTS

| JP | 07-318929 | 12/1995 |
| JP | 08-292413 | 11/1996 |
| JP | 10-282488 | 10/1998 |
| JP | 2003-043239 | 2/2003 |
| JP | 2003-222851 | 8/2003 |
| JP | 2003-270628 | 9/2003 |
| JP | 2004037500 A | 2/2004 |
| JP | 2004-093670 | 3/2004 |
| JP | 2005338645 A * | 12/2005 |

OTHER PUBLICATIONS

Extended European search report dated Feb. 3, 2011 for corresponding European application 07743942.0.

Japanese language office action dated Jul. 5, 2011 and its English language translation for corresponding Japanese application 2008517876 cites the foreign patent document above.

* cited by examiner

*Primary Examiner* — Sarah Hahm
(74) *Attorney, Agent, or Firm* — DLA Piper LLP (US)

(57) ABSTRACT

A liquid crystal display panel includes a first base, a second base, and a sealing member. The first base has a display-area portion including a transparent substrate, a light shielding film formed on a surface of the transparent substrate and having a through hole, a light reflecting film formed on the light shielding film, a color filter formed at least in the through hole of the light shielding film, and a transparent electrode formed on the surface of the transparent substrate. The second base includes a transparent substrate, and a transparent electrode formed on the surface of the transparent substrate. The sealing member is a member for sealing liquid crystal between the first base and the second base.

10 Claims, 5 Drawing Sheets

US 8,081,277 B2

LIQUID CRYSTAL DISPLAY PANEL, LIQUID CRYSTAL DISPLAY DEVICE, AND METHOD OF MANUFACTURING LIQUID CRYSTAL DISPLAY PANEL

CROSS-REFERENCE TO THE RELATED APPLICATIONS

This application is a continuation of international application No. PCT/JP2007/060508 filed May 23, 2007, the entire contents of which are incorporated herein by reference. This application also claims benefit of priority under 35 USC 119 to Japanese Patent Application No. 2006-149690 filed May 30, 2006, the entire contents of which are incorporated herein by reference.

BACKGROUND OF THE INVENTION

1. Field of the Invention

The present invention relates to a liquid crystal display panel, a liquid crystal display device, and a method of manufacturing the liquid crystal display panel.

2. Description of the Related Art

In recent years, liquid crystal display devices with liquid crystal display panel have been widespread use for, not only in relatively small information communication equipment such as a portable information terminal, but also in relatively large electric equipment such as a monitor. In particular, portable information terminals and the like employ a transflective liquid crystal display device that requires no backlight, aiming to reduce power consumption. Because a reflective liquid crystal display device uses outside light (e.g., sunlight) as light source, it is often difficult to recognize a display image in a dark room or the like. For this reason, transflective liquid crystal display devices having properties of both transmissive and reflective displays have been developed to enable the user to recognize a display image appropriately even in a dark room or the like as well as to reduce power consumption.

In such a transflective liquid crystal display device, a pixel has a transmission portion that light emitted from a backlight passes through, and a reflection portion that reflects outside light. With this configuration, the transflective liquid crystal display device can display an image by using a backlight and transmitting the light through the transmission portion of each pixel in case of a dark room or the like (a transmissive display mode), and can display an image by using outside light and reflecting the light at the reflection portion of each pixel in case of bright outside (a reflective display mode). The transflective liquid crystal display device with this configuration does not require the use of the backlight all the time, and thus is capable of reducing power consumption. For example, Japanese Patent Application Laid-open No. H8-292413 discloses a conventional transflective liquid crystal display device configured as above.

This conventional transflective liquid crystal display device enables color display both in the transmissive display mode and the reflective display mode. However, it has a trade-off that increasing the color sharpness in the transmissive display mode leads to a reduction in brightness in the reflective display mode, whereas increasing the brightness in the reflective display mode leads to a reduction in color sharpness in the transmissive display mode.

Transflective liquid crystal display devices capable of performing sharp color display in the transmissive display mode and also bright monochrome display in the reflective display mode have been developed, as, for example, disclosed in Japanese Patent Application Laid-open No. 2004-93670.

In this transflective liquid crystal display device, when a color filter is formed on a portion where no reflecting film is formed, and no color filter is formed on a reflecting film, a large thickness difference occurs between the reflecting film (e.g., 0.1 micrometer) and the color filter (e.g., 1 micrometer to 2 micrometers). This results in a relatively large step therebetween (a step that cannot be covered by a general flattening film). Such a step generated causes a relatively large variation in the thickness (Gap) of a liquid crystal layer present between electrodes on substrates. As a result, for example, when display properties are optimized in one of the transmissive display mode and the reflective display mode, properties such as a contrast ratio are degraded in the other display mode. When the thickness of the flattening film is increased beyond a general range to reduce the effects of the relatively large step, the following four problems may occur. First, the increased thickness of the flattening film causes difficulty in ensuring a uniform thickness of the flattening film itself, causing variation in image quality of a displayed image. Second, increasing the thickness of the flattening film, which generally has a thickness of about 2 micrometers to 3 micrometers, causes spacers (particle diameter: about 4 micrometers to 6 micrometers) having a relatively higher hardness than the flattening film to cut deeper into the flattening film. The deeper cut causes a variation in cell gap more likely, resulting in variation in driving voltage. Third, since the flattening film is generally made of acrylic resin, the increased ratio of acrylic resin increases the hygroscopic properties thereof, degrading the liquid crystal properties accordingly. Fourth, using an increased amount of the flattening film leads to an increase in cost and weight. Japanese Patent Application Laid-open No. 2004-93670 also discloses a transflective liquid crystal display device including a reflecting film with apertures that is formed on a color filter provided over an entire substrate, aiming to reduce the effects of the step. This transflective liquid crystal display device is not capable of achieving both monochrome display and color display in the reflective display mode.

SUMMARY OF THE INVENTION

It is an object of the present invention to address the above problems in the conventional technology, which provides a liquid crystal display panel, a liquid crystal display device and a method of manufacturing the liquid crystal display panel, each of which improves color impurity in the transmissive mode and display brightness in monochrome mode.

According to one aspect of the present invention, a liquid crystal display panel includes a first base having a display-area portion, a second base, and a sealing member for sealing liquid crystal between the first base and the second base. The display-area portion includes a transparent substrate, and a light shielding film formed on the transparent substrate. The light shield film has a through hole. The display-area portion further includes a light reflecting film formed on the light shielding film, a color filter formed at least in the through hole of the light shielding film, and a transparent electrode formed on the transparent substrate. The second base includes a transparent substrate, and a transparent electrode formed on the transparent substrate.

According to another aspect of the present invention, a liquid crystal display device includes a liquid crystal display panel and a backlight. The liquid crystal includes a first base including a display-area portion, a second base and a sealing member for sealing liquid crystal between the first base and the second base. The display-area portion includes a transparent substrate, a light shielding film formed on a main surface of the transparent substrate and having a through hole. The display-area portion further includes a light reflecting film formed on the light shielding film, a color filter formed at least in the through hole of the light shielding film, and a transparent electrode formed on the main surface of the transparent substrate. The second base includes a transparent substrate, and a transparent electrode formed on a main surface of the transparent substrate. The backlight is located opposite the first base of the liquid crystal display panel.

According to a further aspect of the present invention, a method of manufacturing a liquid crystal display panel includes forming a light shielding film on a main surface of a transparent substrate. The light shielding film has a through hole. The method further includes forming light reflecting films including a first light reflecting film and a second light reflecting film. The first light reflecting film is on the light shielding film which is in a first display-area portion. The second light reflecting film is at least in the through hole of the light shielding film which is in a second display-area portion. The second light reflecting film has a through hole. The method also includes forming color filters including a first color filter and a second color filter. The first color filter is formed at least in the through hole of the light shielding film which is in the first display-area portion. The second color filter is formed at least in the through hole of the light shielding film which in the second display-area portion. The second color filter covers the second light reflecting film. The method further includes forming a transparent electrode on the main surface of the transparent substrate after forming the color filters.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention are described in detail below with reference to the accompanying drawings.

Figure 1:
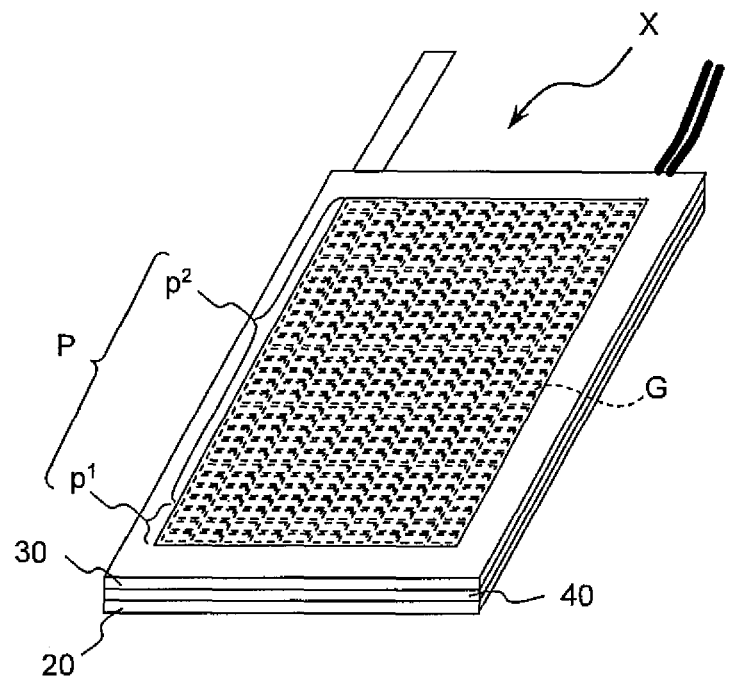
FIG. 1 is a schematic perspective view of a transflective liquid crystal display panel according to an embodiment of the present invention.
Figure 2:
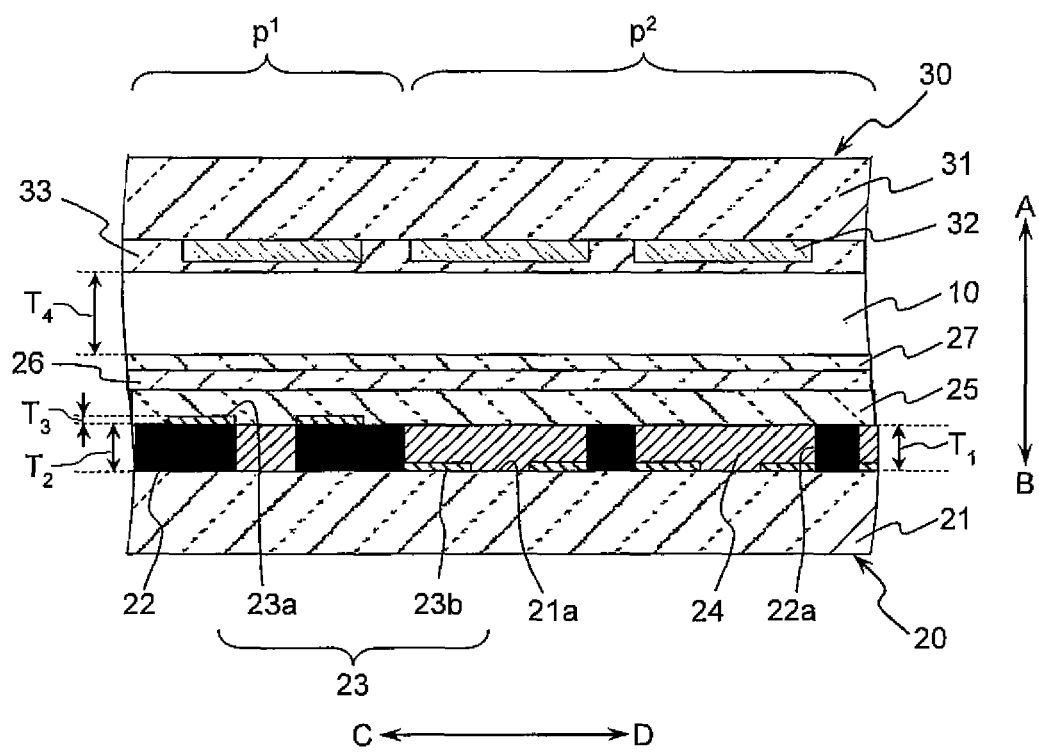
FIG. 2 is an enlarged sectional view of a relevant portion of the liquid crystal display panel illustrated in FIG. 1.

FIG. 1 is a schematic perspective view of a transflective liquid crystal display panel X according to an embodiment. FIG. 2 is an enlarged sectional view of a relevant portion of the liquid crystal display panel X illustrated in FIG. 1.

The liquid crystal display panel X includes a liquid crystal layer 10, a first base 20, a second base 30, and a sealing member 40. The liquid crystal layer 10 is interposed between the first base 20 and the second base 30, and sealed by the sealing member 40, whereby, a display area P is configured to include a plurality of pixels G for displaying an image.

The liquid crystal layer 10 contains liquid crystal that exhibits electrical, optical, dynamic, or magnetic anisotropy, and that has solid regularity and liquid flowability. Examples of such liquid crystal include nematic liquid crystal, cholesteric liquid crystal, and smectic liquid crystal. In this embodiment, nematic liquid crystal (specifically, chiral nematic liquid crystal twisted at 200° to 260°) is employed. In the liquid crystal layer 10, for example, a plurality of particulate spacers (not shown) may be interposed to maintain a constant thickness.

The first base 20 includes a transparent substrate 21, a light shielding film 22, a light reflecting films 23, a color filter 24, a flattening film 25, transparent electrodes 26, and an alignment film 27.

The transparent substrate 21 supports the light shielding film 22, the light reflecting films 23, the color filter 24, and a retardation film 50, described later, and that contributes to sealing the liquid crystal layer 10. The transparent substrate 21 can pass light appropriately in a direction intersecting its main surface (which is the direction shown by an arrow AB). The transparent substrate 21 may include glass, translucent plastic, or other materials.

The light shielding film 22 for shielding light (that is, for controlling an amount of light transmitted to be equal to or less than a predetermined value), and is formed on an upper surface 21a of the transparent substrate 21. The light shielding film 22 has through holes 22a that penetrate in a film thickness direction thereof (which is the direction shown by the arrow AB) to pass light. The light shielding film 22 may include dye or pigment of a color having a high light shielding effect (e.g., black), a resin to which carbon is added (e.g., acrylic-based resin), Cr, or other materials. With the light shielding film 22, a high contrast ratio is achieved in a displayed image.

The light reflecting films 23 for reflecting light include a light reflecting film 23a formed on the light shielding film 22, and a light reflecting film 23b formed on the transparent substrate 21 exposed in the through holes 22a of the light shielding film 22. In this embodiment, the light reflecting film 23a is formed on a predetermined position (e.g., around the through hole 22a) on the light shielding film 22, and the light reflecting film 23b is formed on a predetermined position (e.g., area in the through hole 22a excluding center portion of the through hole 22a) on the transparent substrate 21 that is exposed in the through holes 22a of the light shielding film 22. The light reflecting films 23 may include chrome (Cr), aluminum (Al), silver (Ag), Ag alloy, or other materials.

The color filter 24 selectively absorbs light having a predetermined wavelength from light entering the color filter 24, and that selectively allows light having a predetermined wavelength to path therethrough. The color filter 24 is configured by, for example, adding dye or pigment to acrylic-based resin. The color filter 24 is formed on the transparent substrate 21 that is exposed in the through holes 22a of the light shielding film 22 in a first display-area portion $p_1$ (described later), and the color filter 24 is formed on the transparent substrate 21 and the light reflecting film 23b that are exposed in the through holes 22a of the light shielding film 22 in a second display-area portion $p_2$ (described later). Examples of the color filter 24 may include a red color filter (R) that selectively passes a wavelength of red visible light, a green color filter (G) that selectively passes a wavelength of green visible light, and a blue color filter (B) that selectively passes a wavelength of blue visible light. The thickness of color filter 24, which may be set appropriately considering the amount of light to be transmitted, has a range, for example, from 1.0 micrometer to 2.0 micrometers.

The flattening film 25 is a film for flattening the unevenness generated by disposing the light reflecting films 23 and the color filter 24. The flattening film 25 may include transparent resin such as acrylic-based resin or other materials.

The transparent electrodes 26 for applying a predetermined voltage to the liquid crystal in the liquid crystal layer 10 positioned between the transparent electrodes 26 and transparent electrodes 32 of the second base 30 (described later) are configured to pass the light entering from one side thereof (which is the lower side in the embodiment) to the other side (which is the upper side in the embodiment). The transparent electrodes 26 in this embodiment serve to propagate a predetermined signal (such as an image signal), and are mainly arranged to extend in the direction of arrow CD. The transparent electrodes 26 may include a conducting member having transmission properties, such as indium tin oxide (ITO) or tin oxide. The transmission properties mean properties that allow transmission of light by an amount equal to or more than a reference value.

The alignment film 27 for aligning macroscopically-randomly-oriented liquid crystal molecules of the liquid crystal layer 10 (which have small regularity) to a predetermined direction, is formed on the transparent electrodes 26. The alignment film 27 is made of polyimide resin or other materials. Further, a thickness of the alignment film 27, which may be set appropriately as necessary has a thickness of for example, 0.05 micrometer. Although the alignment film 27 in this embodiment is directly formed on the transparent electrodes 26, an insulating film including insulating resin or silicon dioxide ($SiO_2$) may be interposed between the alignment film 27 and the transparent electrodes 26. With this configuration, even when a conductive foreign material is included between the transparent electrodes 26 of the first base 20 and the transparent electrodes 32 of the second base 30 (described later), sufficient insulation can be maintained between the transparent electrodes 26 and 32. Therefore, this configuration is a preferable configuration in view of preventing defects in display pixels.

The second base 30 includes a transparent substrate 31, the transparent electrodes 32, and an alignment film 33.

The transparent substrate 31 supports the transparent electrodes 32 and the alignment film 33 (described later), and that contributes to sealing the liquid crystal layer 10. The transparent substrate 31 can pass light appropriately in a direction intersecting its main surface (which is a direction shown by the arrow AB). The transparent substrate 31 may include the same material as the transparent substrate 21.

The transparent electrodes 32 for applying a predetermined voltage to the liquid crystal in the liquid crystal layer 10 between the transparent electrodes 32 and the transparent electrodes 26 of the first base 20 are configured to pass the light entering from one side thereof (the lower side in the embodiment) to the other side (the upper side in the embodiment). The transparent electrodes 32 in this embodiment serve to propagate a predetermined signal (such as a scan signal) for controlling the switching an applied voltage to the liquid crystal layer 10, and are mainly arranged to extend in a direction perpendicular to a sheet surface of FIG. 2. The transparent electrodes 32 may include the same material as the transparent electrodes 26.

The alignment film 33 for aligning the macroscopically-randomly-oriented liquid crystal molecules in the liquid crystal layer 10 (which have small regularity) to a predetermined direction is formed on the transparent electrodes 32. The alignment film 33 may include the same material as the alignment film 27. Further, the alignment film 33, which may be set appropriately as necessary, has a thickness of, for example, 0.05 micrometer. Although the alignment film 33 in this embodiment is directly formed on the transparent electrodes 32, an insulating film including insulating resin or silicon dioxide ($SiO_2$) may be interposed between the alignment film 33 and the transparent electrodes 32. With this configuration, even when a conductive foreign material is included between the transparent electrodes 26 of the first base 20 and the transparent electrodes 32 of the second base 30 (described later), sufficient insulation can be maintained between the transparent electrodes 26 and 32. Therefore, this configuration is a preferable configuration in view of preventing defects in display pixels.

The sealing member 40 contributes to sealing the liquid crystal layer 10 between the first base 20 and the second base 30, and serves to bond the first base 20 and the second base 30 with a predetermined interval therebetween. The sealing member 40 is made of insulating resin, sealing resin, or the like.

The liquid crystal display panel X in this embodiment has the light reflecting film 23 formed on the light shielding film 22 at the first base 20. Therefore, even when the liquid crystal display panel X has an increased thickness T1 of the color filter 24 to improve the color purity in the transmissive display mode, sufficient display brightness can be maintained in monochrome display in the reflective display mode. This enables the liquid crystal display panel X to achieve high color purity in the transmissive display mode, and high display brightness in monochrome display in the reflective display mode.

The liquid crystal display panel X has the same thickness $T_2$ of the light shielding film 22 as the thickness $T_1$ of the color filter 24 nearly the same (without adjusting the thickness $T_1$ of the color filter 24 with respect to a thickness $T_3$ of the light reflecting film 23), whereby a step generated between an upper surface of the light reflecting film 23 formed on the light shielding film 22 and an upper surface of the color filter 24 is made substantially the same (e.g., 0.1 micrometer) as the thickness $T_3$ of the light reflecting film 23 (i.e., a step that can be sufficiently covered by the flattening film 25). The liquid crystal display panel X sufficiently reduces a variation in thickness $T_4$ of the liquid crystal layer 10 between the first base 20 and the second base 30. This enables the liquid crystal display panel X to significantly improve display properties (e.g., contrast ratio, color purity, transmittance, and reflectance) in the display area P.

The display area P of the liquid crystal display panel X includes the first display-area portion $p_1$ that performs monochrome display in the reflective display mode, and the second display-area portion $p_2$ that performs color display in the reflective display mode. Thus, the liquid crystal display panel X can perform both monochrome display and color display in the reflective display mode. Since monochrome display may often suffice for indication for remaining charge of a battery, indication of radio wave conditions and indication of time, or other indications in the displays of portable telephones or fixed telephones, this configuration performing both monochrome display and color display can reduce power consumption during standby by using a portion of the display (a portion used for the indication of remaining charge of a battery or other indications) as a monochrome display. In particular, the airtime of portable telephones and other mobile devices can be increased. Further, the liquid crystal display panel X can perform color display with high visibility using the reflective display mode that utilizes outside light even in an environment such as daylight, where the visibility in the transmissive display mode is low due to the outside light having higher light intensity than the source light.

Figure 3A:
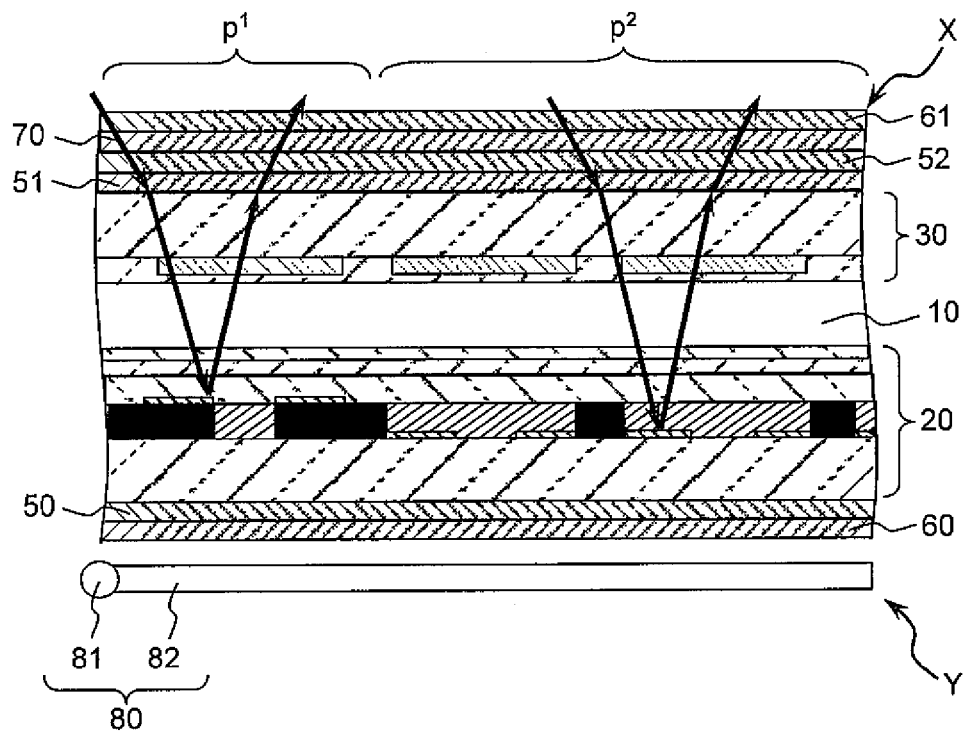
FIGS. 3A and 3B are schematic cross sectional views of a liquid crystal display device including the liquid crystal display panel illustrated in FIG. 1, illustrating light paths in a reflective display mode and in a transmissive display mode, respectively.
Figure 3B:
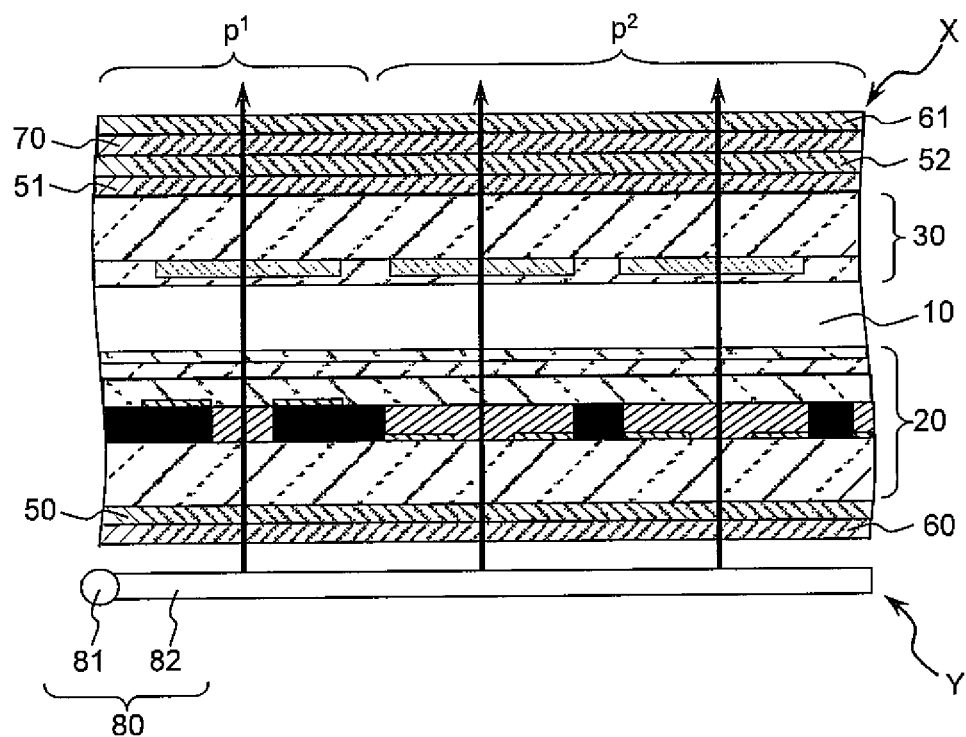

FIG. 3 illustrates schematic cross sectional views of a liquid crystal display device Y including the liquid crystal display panel X according to the embodiment. FIG. 3A illustrates light paths in the reflective display mode, and FIG. 3B illustrates light paths in the transmissive display mode. The liquid crystal display device Y includes the liquid crystal display panel X, retardation films 50, 51, and 52, polarizers 60 and 61, a light diffusing layer 70, and a backlight 80.

The retardation films 50, 51, and 52 are optical compensation members for converting elliptically-polarized light that is converted from linearly polarized light due to the birefringence (phase shift) of the liquid crystal, from the elliptically polarized state to substantially linearly polarized state. Examples of the retardation films 50, 51, and 52 may include a uniaxially-stretched polymeric film having a predetermined retardation value that is set according to a retardation value of the liquid crystal layer 10. The retardation films 50, 51, and 52 may include polycarbonate (PC), polyvinyl alcohol (PVA), polyarylate (PA), polysulfone (Psu), polyolefin (PO), or other materials. PC is preferable regarding the consistency with the wavelength dispersion of the liquid crystal. Regarding adaptability to a circularly polarizing plate, PO is preferable due to its small photoelastic coefficient compared with the PC. In the embodiment, the retardation film 50 is provided on a lower surface of the transparent substrate 21 (near the backlight 80), and the retardation films 51 and 52 are disposed on an upper surface of the transparent substrate 31 (opposite the backlight 80). This configuration improves the contrast ratio of a displayed image. Although the three retardation films 50, 51, and 52 are used in the described positions in the embodiment, the position and the number of retardation films used may be set appropriately as necessary.

The polarizers 60 and 61 selectively serve to pass the light that oscillates in a predetermined direction. The polarizers 60 and 61 may include iodine-based material or the like. The polarizer 61 of the embodiment is provided to be orthogonal to an axial direction of the polarizer 60 (the polarizer 61 selectively passes light oscillating in a direction parallel to this axial direction). This configuration is a preferable configuration in view of that the polarizers 60 and 61 effectively serve as shutters for the light passing therethrough. Although the liquid crystal display panel X in the embodiment does not include the polarizers 60 and 61, the liquid crystal display panel X may include them.

The light diffusing layer 70 prevents light reflected from the light reflecting film 23a from being specularly reflected, and also serves to diffuse the light reflected from the light reflecting film 23a to provide a wide viewing angle in the reflective display mode. In the embodiment, the light diffusing layer 70 is provided between the retardation film 52 and the polarizer 61. As long as being above the transparent substrate 31, the light diffusing layer 70 may be interposed in any portion between the retardation films 51 and 52 and the polarizer 61. In the embodiment, the light diffusing layer 70 is formed by dispersing scattering particles for scattering light in an adhesive (e.g., glue) for bonding the retardation films 51 and 52 and the polarizer 61. The light diffusing layer 70 is not limited to this, and a film including the scattering particles scattered therein, for example, may be interposed between the retardation films 51 and 52 and the polarizer 61 with the adhesive. Examples of the adhesive may include acrylic, rubber, silicone, vinylalkyl ether, polyvinyl alcohol, polyacrylic amide, cellulose, or other materials. Examples of the scattering particles may include silica, alumina, titania, zirconia, tin oxide, indium oxide, cadmium oxide, antimony oxide, or organic materials.

The backlight 80 emits light from one side (the back) of the liquid crystal display panel X to the other side (the front). The backlight 80 includes a light source 81 and a light guide plate 82. The light source 81 emits light to the light guide plate 82, and is formed of a compact fluorescent lamp (CFL), a light emitting diode (LED), a halogen lamp, a xenon lamp, an electro-luminescence (EL) light source, or the like. The light guide plate 82 introduces the light emitted from the light source 81 substantially uniformly over a lower surface of the liquid crystal display panel X. The light guide plate 82 includes a reflection sheet (not shown) that is generally provided on the rear surface (lower surface) of the liquid crystal display panel X, and reflects light; a diffusion sheet (not shown) that is provided on the front surface (upper surface) of the liquid crystal display panel X, and diffuses light to make more uniform surface-emitting light; and a prism sheet (not shown) that is provided on the front surface, and collects light to be in a substantially constant direction. The light guide plate 82 may include transparent resin such as acrylic resin or polycarbonate resin. In the embodiment, the backlight 80 of an edge light system is used in which the light source 81 is provided along a side surface of the light guide plate 82 as illustrated in FIG. 3. A backlight of other systems may be used, such as a direct light system in which the light source 81 is provided over the back surface of the liquid crystal display panel X.

Referring to FIG. 3, the following briefly describes the principle of color display or monochrome display in each display mode of the liquid crystal display device Y. In the reflective display mode as illustrated in FIG. 3A, the outside light entering from above in the first display-area portion $p_1$ is reflected on the light reflecting film 23 and emitted upward, traveling through no color filter 24 interposed. Thus, monochrome display is performed. In the second display-area portion $p_2$, the outside light entering from above is reflected on the light reflecting film 23 and emitted upward, traveling through the color filter 24 interposed. Thus, color display is performed. On the contrary, in the transmissive display mode as illustrated in FIG. 3B, the light emitted from the backlight 80 outgoes upward in the first display-area portion $p_1$ and the second display-area portion $p_2$, traveling through the color filter 24 interposed. Thus, color display is performed.

The liquid crystal display device Y includes the liquid crystal display panel X, and therefore achieves the same advantages as the liquid crystal display panel X. Specifically, the liquid crystal display device Y achieves high color purity in the transmissive display mode and high display brightness in monochrome display in the reflective display mode, while improving the display properties (e.g., contrast ratio, color purity, transmittance, and reflectance).

The following describes a method of manufacturing the liquid crystal display panel X. FIGS. 4 and 5 are cross sectional views of the first base 20 of the liquid crystal display panel X, illustrating changes with time.

Figure 4A:
FIGS. 4A to 4C are cross sectional views of a first base of the liquid crystal display panel illustrated in FIG. 1, illustrating changes with time during manufacture.

As illustrated in FIG. 4A, the light shielding film 22 is formed on the upper surface of the transparent substrate 21.

Figure 4B:
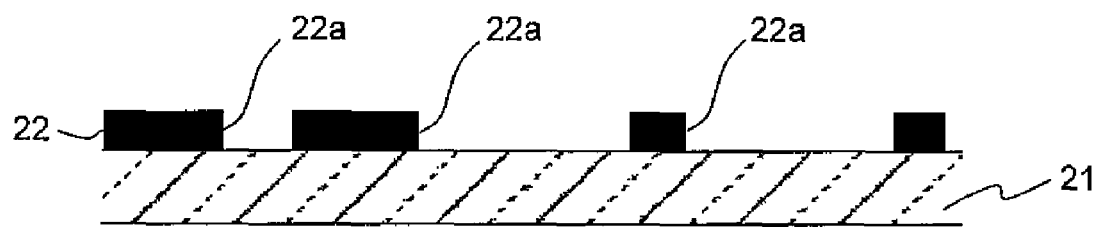

As illustrated in FIG. 4B, the through holes 22a are made at predetermined positions in the light shielding film 22 by well-known processing technology (e.g., photolithography).

Figure 4C:
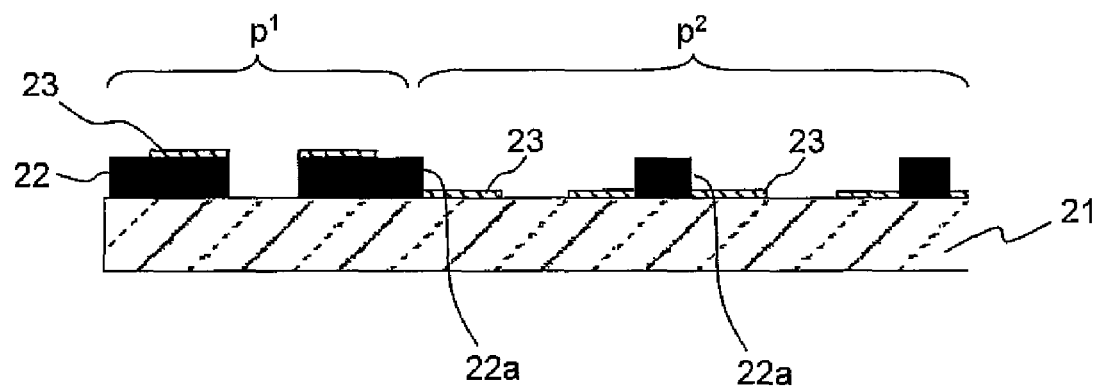

As illustrated in FIG. 4C, the light reflecting films 23 are formed on the light shielding film 22 in the first display-area portion $p_1$ and formed on the transparent substrate 21 in the through holes 22a of the light shielding film 22 in the second display-area portion $p_2$ by well-known film forming technology (e.g., spattering or vapor-deposition method). Then, by known processing technology (e.g., photolithography), patterning is performed to leave the light reflecting films 23 at predetermined positions (around the through holes 22a in the embodiment) on the light shielding film 22 in the first display-area portion $p_1$ and at predetermined positions (areas in the through holes 22a excluding the center portions of the through holes 22a) on the transparent substrate 21 in the through holes 22a of the light shielding film 22 in the second display-area portion $p_2$.

Figure 5A:
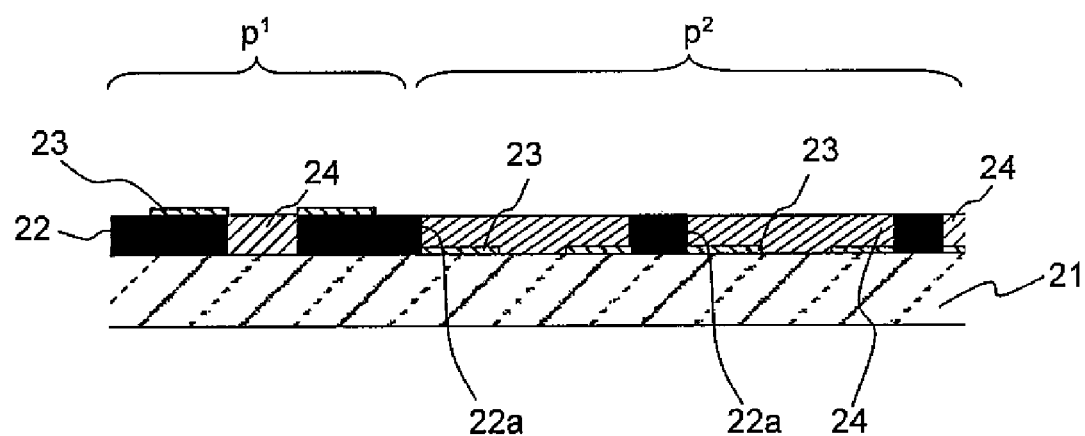
FIGS. 5A and 5B are cross sectional views illustrating processes subsequent to those of FIGS. 4A to 4C.

As illustrated in FIG. 5A, after the color filter 24 of a first color (e.g., red) is formed on the transparent substrate 21 having the patterned light reflecting films 23 formed thereon, patterning for the color filter is performed by well-known processing technology (e.g., photolithography). The patterning is performed such that the color filter 24 of the first color is formed in predetermined through holes 22a of the light shielding film 22 which is arranged in the first display-area portion $p_1$ and in the second display-area portion $p_2$. The color filter 24 of other colors (e.g., green, blue) is also formed in a similar manner.

Figure 5B:
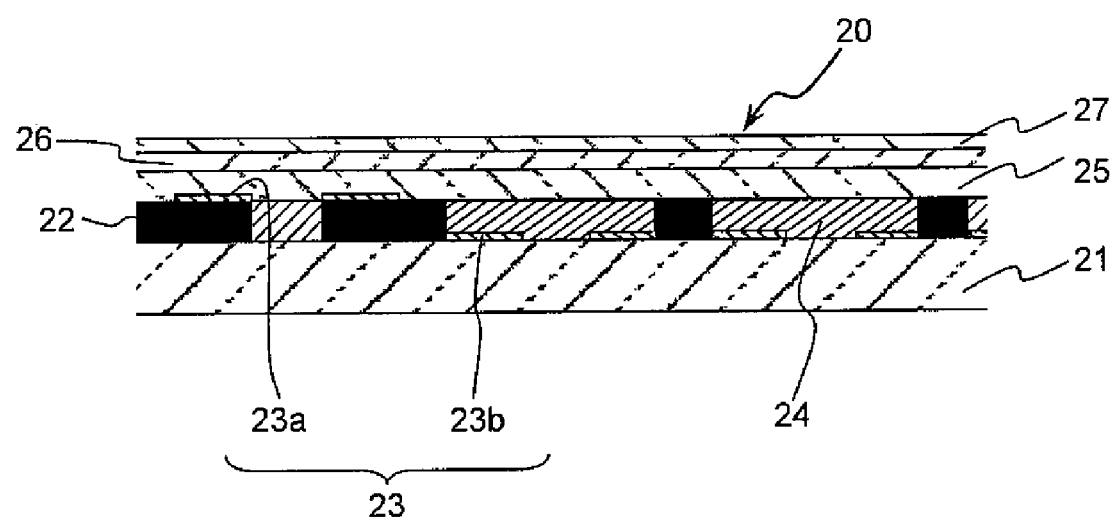

As illustrated in FIG. 5B, the flattening film 25, the transparent electrodes 26, and the alignment film 27 are stacked in this order on the upper surface of the transparent substrate 21 where the light shielding film 22, the light reflecting film 23a, and the color filter 24 are formed.

The liquid crystal display panel X is manufactured through the process that the first base 20 formed as described above, and the second base including a stack of the transparent electrodes 32 and the alignment film 33 both formed on the lower surface of the transparent substrate 31 are bonded with the sealing member 40 that seals the liquid crystal between the upper surface of the first base 20 and the lower surface of the second base 30. The liquid crystal display panel X may be in a condition that the liquid crystal is already interposed between the upper surface of the first base 20 and the lower surface of the second base 30, or may be in a condition that liquid crystal is yet to be interposed therebetween.

The method of manufacturing the liquid crystal display panel X is effective regarding work efficiency in manufacturing the liquid crystal display panel X. Specifically, with this manufacturing method, the light reflecting film 23a for monochrome display in the reflective display mode, and the light reflecting film 23b for color display in the reflective display mode can be formed concurrently at one process. This improves the work efficiency, compared with forming the light reflecting film 23a and the light reflecting film 23b at separate processes. The light reflecting film for monochrome display in the reflective display mode, and the light reflecting film for color display in the reflective display mode may be formed at separate processes, for example, when the light reflecting film for the monochrome display is formed on the color filter aiming to perform both monochrome display and color display in the reflective display mode.

Although the invention has been fully described in connection with embodiments thereof, it is to be noted that the invention is not limited to the above embodiments and various changes and modification may be included within the scope of the invention.

Figure 6:
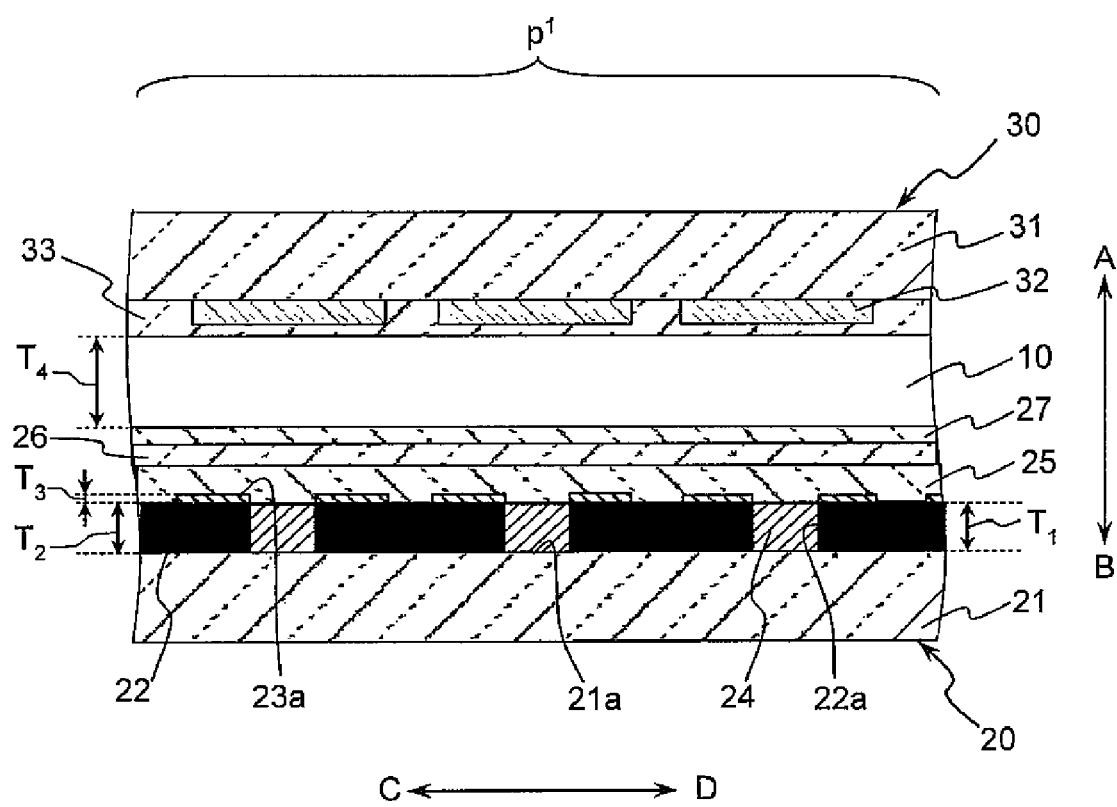
FIG. 6 is an enlarged sectional view of a relevant portion of a transflective liquid crystal display panel according to another embodiment of the present invention.

The liquid crystal display panel X includes, as the display area P, the first display-area portion $p_1$ and the second display-area portion $p_2$. The liquid crystal display panel X is not limited to these portions and may include only the first display-area portion $p_1$ as illustrated in FIG. 6.

In the liquid crystal display panel X, the flattening film 25 is not an essential element and may be removed when the step can be made sufficiently small enough as described above. Such a configuration improves the light transmittance, achieving a cost reduction and improved work efficiency. Further, since this configuration enables the light reflecting film 23a to be stacked on the transparent electrodes 25, the resistance of the electrodes is reduced. As a result, the effect of the resistance on the display properties (e.g., a variation in driving voltage) can be smaller.

In the liquid crystal display panel X, the through holes of the light shielding film 22 and the light reflecting film 23 are formed near the center portion. The forming positions are not limited to this and may be changed appropriately as required.

As set forth hereinabove, according to an embodiment of the present invention, even when the color filter is thicker to improve color purity in the transmissive display mode, sufficient display brightness can be ensured in monochrome display in the reflective display mode. Thus, it is possible to achieve high color purity in the transmissive display mode as well as high display brightness in monochrome display in the transmissive display mode.

Setting a difference between a thickness of the light shielding film and that of a color filter small (without adjusting the thickness of the color filter with respect to the thickness of the light reflecting film) allows a step between an upper surface of the light reflecting film and that of the color filter to be smaller so that the step can be covered, by a general flattening film or no flattening film is necessary. This allows the liquid crystal display panel to have a reduced variation in the thickness of a liquid crystal layer between the first substrate and a second substrate. In addition, because a sufficient thickness can be ensured for the color filter, the color purity is significantly improved in color display in the transmissive display mode. Thus, it is possible to improve the display properties of the liquid crystal display panel (e.g., white color purity and color gamut (NTSC ratio)).

What is claimed is:

1. A liquid crystal display panel comprising:
    a first base including a first display-area portion configured to perform monochrome display in a reflective display mode, and a second display-area portion configured to perform color display in the reflective display mode,
    wherein the first display-area portion comprises
        a first transparent substrate,
        a first light shielding film on a main surface of the first transparent substrate in the first display-area portion and having a first through hole penetrating through the first light shielding film in a thickness direction thereof,
        a first light reflecting film the first light shielding film,
        a first color filter on the main surface exposed via the first through hole, and
        a first transparent electrode above the main surface of the first transparent substrate;
    wherein the second display-area portion comprises
        the first transparent substrate,
        a second light shielding film on the main surface of the first transparent substrate in the second display-area portion and having a second through hole penetrating through the second light shielding film in a thickness direction thereof, a second light reflecting film on the main surface exposed via the second through hole, the second light reflecting film having a third through hole penetrating through the second light reflecting film in a thickness direction thereof, a second color filter on the main surface exposed via the third through hole and the second light reflecting film, and the first transparent electrode extending from the first display-area portion;

a second base that includes a second transparent substrate, and a second transparent electrode on a main surface of the second transparent substrate; and a sealing member configured for sealing liquid crystal between the first base and the second base.

2. The liquid crystal display panel according to claim 1, wherein the first light shielding film and the first color filter are substantially equal in thickness.

3. The liquid crystal display panel according to claim 1, wherein the second light shielding film and the second color filter are substantially equal in thickness.

4. A liquid crystal display device comprising:
the liquid crystal display panel according to claim 1; and
a backlight that is located opposite the first base of the liquid crystal display panel.

5. A method of manufacturing a liquid crystal display panel, comprising:
forming, on a main surface of a transparent substrate, a first light shielding film having a first through hole penetrating through the first light shielding film in a thickness direction thereof and a second light shielding film having a second through hole penetrating through the second light shielding film in a thickness direction thereof;
forming a first light reflecting film on the first light shielding film in a first display-area portion that performs monochrome display in a reflective display mode, and a second light reflecting film on the main surface exposed via the second through hole in a second display-area portion that performs color display in the reflective display mode, the second light reflecting film having a third through hole penetrating through the second light reflecting film in a thickness direction thereof;
forming a first color filter formed at least on the main surface exposed via the first through hole in the first display-area portion, and a second color filter on the main surface exposed via the third through hole and on the second light reflecting film; and
forming a transparent electrode above the main surface of the transparent substrate after forming the first and the second color filters.

6. A liquid crystal display panel comprising:
a first base including a first display-area portion configured to perform monochrome display in a reflective display mode, and a second display-area portion configured to perform color display in the reflective display mode,
wherein the first display-area portion comprises
a first transparent substrate,
a first light shielding film on a main surface of the transparent substrate in the first display-area portion and having a first penetrating portion penetrating through the first light shielding film in a thickness direction thereof,
a first light reflecting film on the first light shielding film,
a first color filter on the main surface of the first transparent substrate corresponding to where the first penetrating portion is formed, and
a first transparent electrode above the main surface of the first transparent substrate, wherein the second display-area portion comprises
the first transparent substrate,
a second light shielding film on the main surface of the first transparent substrate in the second display-area portion and having a second through hole penetrating through the second light shielding film in a thickness direction thereof,
a second light reflecting film on the main surface exposed via the second through hole, the second light reflecting film having a third through hole penetrating through the second light reflecting film in a thickness direction thereof,
a second color filter on the main surface exposed via the third through hole and the second light reflecting film, and
the first transparent electrode extending from the first display-area portion;
a second base that includes a second transparent substrate, and a second transparent electrode on a main surface of the second transparent substrate; and
a sealing member for sealing liquid crystal between the first base and the second base.

7. The liquid crystal display panel according to claim 6, wherein the first light shielding film and the first color filter are substantially equal in thickness.

8. The liquid crystal display panel according to claim 6, wherein the second light shielding film and the second color filter are substantially equal in thickness.

9. A liquid crystal display device comprising:
the liquid crystal display panel according to claim 6; and
a backlight that is located opposite the first base of the liquid crystal display panel.

10. A method of manufacturing a liquid crystal display panel, comprising:
forming, on a main surface of a transparent substrate, a first light shielding film having a first penetrating portion penetrating through the first light shielding film in a thickness direction thereof and a second light shielding film having a second penetrating portion penetrating the second light shielding film in a thickness direction thereof;
forming a first light reflecting film on the first light shielding film in a first display-area portion that performs monochrome display in a reflective display mode, and a second light reflecting film on the main surface of the transparent substrate corresponding to where the second penetrating portion of the second light shielding film in a second display-area portion that performs color display in the reflective display mode is formed, the second light reflecting film having a third penetrating portion penetrating through the second light reflecting film in a thickness direction thereof in cooperation with the second light shielding film;
forming a first color filter on the main surface of the transparent substrate corresponding to where the first penetrating portion of the first light shielding film in the first display-area portion is formed, and forming a second color filter on the main surface of the transparent substrate corresponding to where the third penetrating portion of the second light reflecting film in the second display-area portion is formed and on the second light reflecting film; and
forming a transparent electrode on the main surface of the transparent substrate after forming the first and second color filters.

* * * * *